United States Patent [19]

Boon

[11] Patent Number: 4,711,407
[45] Date of Patent: Dec. 8, 1987

[54] ROLL LIFTING, TRANSPORTING, AND UNROLLING DOLLY SYSTEM AND METHOD

[76] Inventor: Charles W. Boon, 515 33rd St., Fort Madison, Iowa 52627

[21] Appl. No.: 11,262

[22] Filed: Feb. 5, 1987

[51] Int. Cl.$^4$ ............................................. B65H 75/40
[52] U.S. Cl. ................... 242/86.52; 254/8 R; 414/458; 414/540; 414/908; 414/911
[58] Field of Search ............. 242/86.52, 86.5 R, 86.7, 242/94; 414/911, 908, 540, 495, 427, 476, 458; 254/8 R, 8 B; 156/577

[56] References Cited

U.S. PATENT DOCUMENTS

| | | | |
|---|---|---|---|
| 938,418 | 2/1911 | Ames | 254/8 B |
| 1,336,037 | 4/1920 | Grange | 254/8 B |
| 2,974,972 | 3/1961 | Hassell | 414/495 X |
| 3,279,753 | 10/1966 | Ventriglio et al. | 254/8 R |
| 3,374,964 | 3/1968 | Carvotta | 242/86.52 |
| 3,944,094 | 3/1976 | Compton | 414/458 |
| 4,030,704 | 6/1977 | Beierle et al. | 414/911 X |
| 4,243,468 | 1/1981 | Boyd | 242/86.52 X |
| 4,295,777 | 10/1981 | Bell et al. | 414/458 |

FOREIGN PATENT DOCUMENTS

| | | | |
|---|---|---|---|
| 154606 | 10/1938 | Fed. Rep. of Germany | 242/86.5 R |
| 89536 | 1/1966 | France | 242/86.52 |
| 2043880 | 2/1971 | France | 414/458 |

*Primary Examiner*—John M. Jillions
*Attorney, Agent, or Firm*—Learman & McCulloch

[57] ABSTRACT

A demountable roll lifting and transport system has laterally spaced apart dollies, each comprising a set of front and rear ground-supported wheels with a wheel fork for each wheel. One of the forks of each set is formed with a journal and the other is formed with a shaft received coaxially in the journal to mount the wheel forks for movement between spread, rool-loading position and convergent, raised, roll-transport position. A lever swingably mounts to one fork of each set for fulcrumming engagement with the periphery of one of the wheels to raise the wheel forks to transport position when the lever is pushed downwardly against the wheel. A demountable roll support extends between the dollies, and a releasable latch disengageably secures the wheel forks in roll-transport position.

16 Claims, 5 Drawing Figures

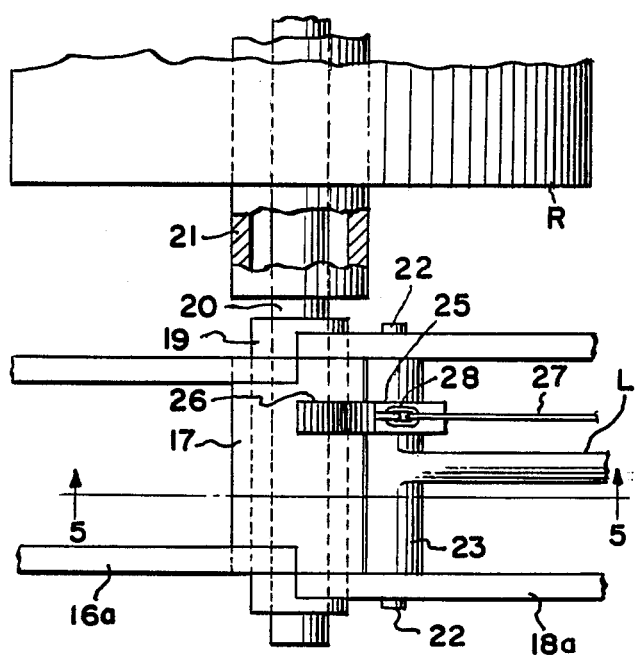
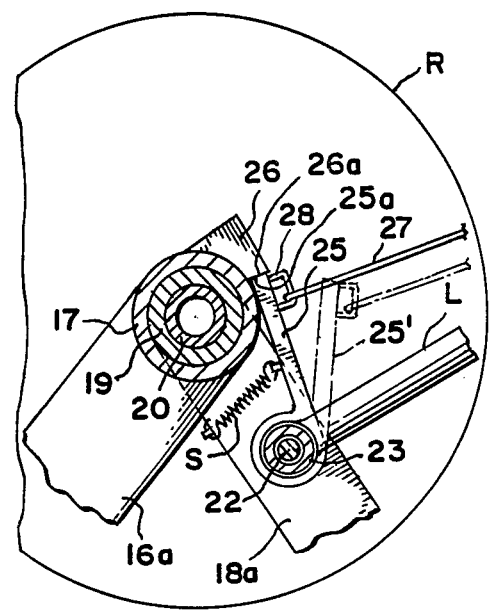
FIG. 4
FIG. 5

4,711,407

ROLL LIFTING, TRANSPORTING, AND UNROLLING DOLLY SYSTEM AND METHOD

BACKGROUND OF THE INVENTION

This invention relates to dolly systems for facilitating the lifting of heavy rolls of material from the ground to a position of transport, and particularly to a dolly assembly which can be used to pay out the material, when the leading end of the roll is anchored in position as the roll is transported and unwinds. Prior art assemblies, none of which have the composite attributes of the dolly assembly which will be described herein, have been proposed, and some of them are disclosed in the following prior art patents:

U.S. Pat. Nos. 983,418 to Ames; 1,014,991 to Ames; 1,014,992 to Ames; 1,377,147 to Dillon; 3,944,094 to Compton; 4,295,777 to Bell et al;

The prior art dollys have taken various forms, and are perhaps exemplified in U.S. Pat. No. 4,295,777 wherein jacks are provided on each of two dolly frames, and are used to raise a roll of carpeting, for instance, to an elevated position for transport. It is to be emphasized that the dolly assemblies to be presently described are capable of being used on roofs to lay out relatively heavy, elongated rolls of roof covering material.

SUMMARY OF THE INVENTION

One of the prime objects of the present invention is to provide a relatively lightweight, easily transportable dolly assembly which may be readily partly disassembled and carried up ladders or the like to a roof, and then rapidly reassembled for use in transporting rolls of single-ply roof covering material which are separately lifted to the roof. The dolly assembly is used to unwind the wound strip of material from the roll and position it on the roof to facilitate its seam welding to an adjacent strip of material.

Another object of the invention is to provide separate, wheel-supported dolly frames, between which the roll of material may be supported, the frames being so constructed as to be readily raised, from a position in which the roll support system carried by the frames is in lowered, roll-loading position, to an elevated position for transport.

Still a further object of the invention is to design a dolly assembly of the character described which need not employ jacks, and can still be readily raised to roll-transporting position with the necessary mechanical advantage.

Still a further object of the invention is to provide a new and improved method of handling heavy, elongated rolls of sheet material, which is easy to practice in a most economic and convenient manner.

The dolly assembly to be described in detail, comprises laterally spaced apart, separate wheel assemblies, each consisting of a set of front and rear ground-supported wheels, the front and rear wheels being connected one to the other by wheel forks. One of the wheel forks of each set is formed with a journal, and the other is formed with a shaft, received coaxially in the journal to mount the wheel forks for movement from a position in which the wheels are spread apart and the roll-supporting member supported by the forks is in lowered position, to a raised transport position in which the wheel forks are upwardly convergent and the wheels are more closely spaced. A lever swingably mounts to one of the forks of each set, and is in alignment vertically with one of the wheels so that it can come into fulcruming engagement with the periphery of one of the wheels and function to raise the wheel forks to transport position, after which the wheel forks can be latched in roll transport position.

Other objects and advantages of the invention will be pointed out specifically, or will become apparent from the following description when it is considered in conjunction with the appended claims and the accompanying drawings.

THE DRAWINGS

FIG. 1 is a side elevational view of the dolly assembly, with the wheels in a spread-apart position in which the roll support member is in a roll-loading position;

FIG. 2 is similar view, showing the wheel forks in raised, convergent, latched position supporting the roll for transport, and showing the leading edge of the roll being paid out as the assembly moves in the direction of the arrow from the leading edge thereof, the chain lines indicating the position of the handle lever after the wheels were moved together by fulcruming engagement of the handle lever with the one wheel, and before the lever was moved to the position in which it is shown in solid lines;

FIG. 4 is a fragmentary, top plan view, taken on the line 4—4 of FIG. 2; and

FIG. 5 is an enlarged, side elevational view particularly illustrating the latch mechanism, the chain lines indicating the disengaged position of the swingable latch member.

Figure 1:
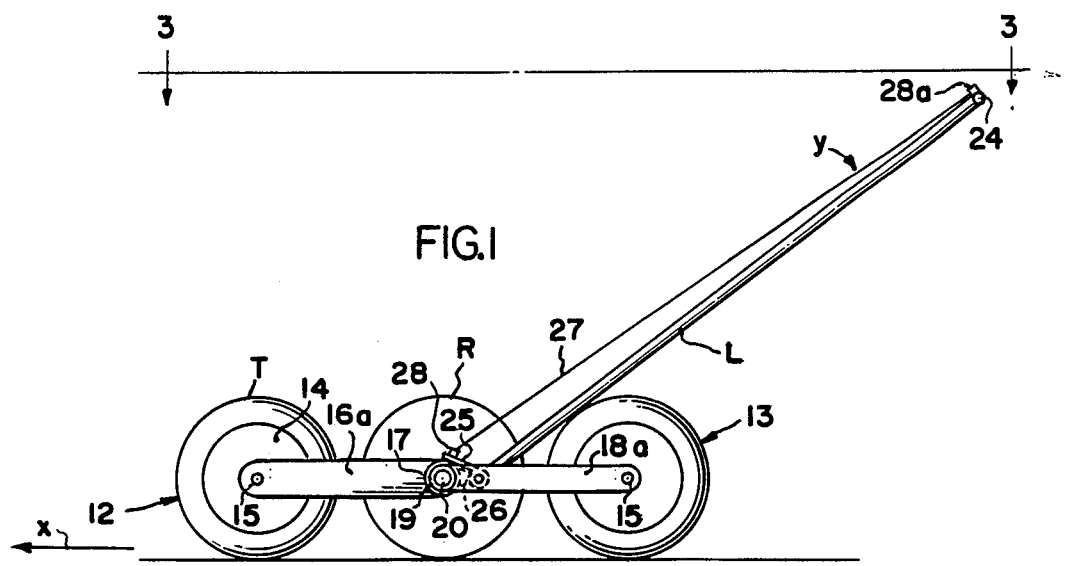

Referring now more particularly to the accompanying drawings, the separable demountable dolly assembly includes spaced apart sets 10 and 11 of front and rear wheels 12 and 13, respectively, each of which includes an air-filled tire T mounted on the rim of a wheel 14, which is journaled on an axle 15.

The front axle 15 is carried by a front axle fork, generally designated 16, comprising fork legs 16a for supporting the axle 15, extending from a sleeve journal 17. Each rear wheel 13 is carried by a wheel fork, generally designated 18, which includes legs 18a for supporting the rear axle 15, extending from a sleeve journal 19. The journals 19 are pivotally received in the journals 17. The sleeve shafts 19 constitute journals for receiving a shaft 20, which is adapted to be inserted through the sleeve 21 on which the roll of material R is wound, and which consists of, for example, a roll of thermoplastic roofing fabric whose leading edge is shown at F in FIG. 2.

Provided on each of the rear wheel forks 18, is a pin or shaft 22 received within a sleeve journal 23, which constitutes the front end of a lever, generally designated L, having a handlebar 24. Rotatably mounted on the journal 23 of each of the set of wheel assemblies 10 and 11, is a swingable latch member 25 which, in the position in which it is shown in solid lines in FIG. 5, engages an abutment 26 fixed to the journal 17. The stop 26 is cut off as at 26a at a locking angle and the latch member 25 is cut off at a complementary angle 25a.

A cord 27 connected to the latch 25 at an eye member 28, extends to connect to an eye 28a on the handle 24, where it is anchored in an accessible position and can be pulled (once stop 26 is backed off slightly) to move the latch 25 to the broken line position, shown at 25'. The inclinarity of surfaces 26a and 25a is greater than the arc of pivot of latch 25 and prevents this from occurring, unless levers L have been pivoted to down position sufficiently to raise the wheels 12 off the ground slightly.

In operation, each of the wheel assemblies 10 and 11 is individually transported to the roof of a building by way of a ladder or the like. It is then disposed opposite the ends of a roll R, with its wheels 12 and 13 in spread-apart position. The levers L can be engaged with the tires T which serve as fulcrums to raise the wheel forks sufficiently to axially align the roll sleeve 21 with the sleeves 19. Then the shaft 20 is inserted from one end, through the one sleeve 19, the sleeve 21 on which the fabric is wound at the factory, and through the opposite journal sleeve 19. The use of shaft 20 distributes the load of the roll evenly without canting the wheels inwardly. With an operator stationed at each handle 24, each lever L is pushed down on the periphery of the traction-providing tire T of each rear wheel 13, as indicated by the arrow y in FIG. 1. Relatively lightweight levers L can be used because the tires depress and, accordingly, greater areas of the levers engage the tires.

Figure 2:
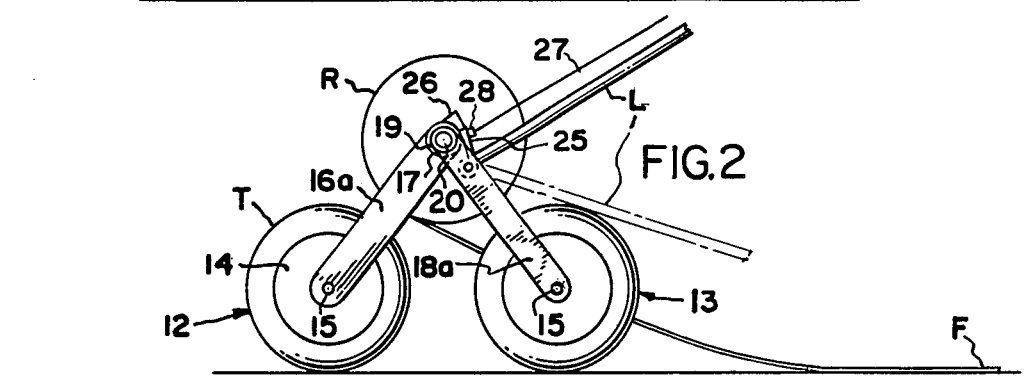
Figure 3:
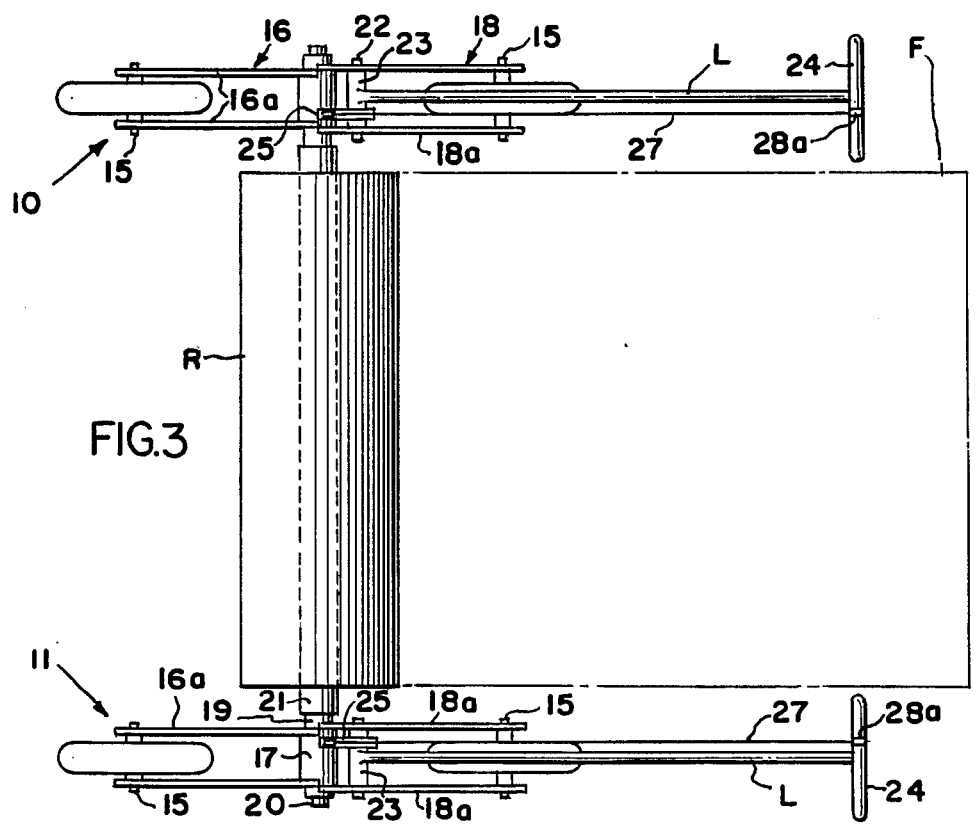
FIG. 3 is a top plan view, taken on the line 3—3 of FIG. 1.

When fulcruming pressure is exerted upon the handles 24, the wheel forks 16 and 18 are raised to the convergent position illustrated in FIG. 2, and the stops 26 ride up from under latches 25 until the latches are pulled by the return springs S into abutting relation with the stops 26 and latch the wheel forks 16 and 18 in the raised position in which they support the roll R in a raised position above the ground. If the leading edge of the fabric F is then anchored by placing a weight on it, and the dolly assemblies shown in FIG. 2 are moved in the direction x, the fabric F will be paid out from the roll R to lay the fabric strip in the desired position on the roof. Plainly, successive, side-by-side, fabric strips may be so laid in a position of slight overlap, so that their lapped edges may be seam welded to form a unitary roof covering.

Alternatively, to transport and then lower the wheel forks 16 and 18 to unload a transported roll without unwinding it, it is merely necessary to push the levers L down into engagement with the wheels 13 sufficiently to raise wheels 12 off the ground prior to pulling the cords 27 to raise the latches 25, after which the forces of gravity will cause the wheels 12 and 13 to safely return to spread position. If the latches 25 could be released without this preparation, levers L would tend to snap up due to the weight of roll R, and might cause injury.

While one embodiment of the invention has been described in detail, it will be apparent to those skilled in the art that the disclosed embodiment may be modified. Therefore, the foregoing description in all aspects is to be considered exemplary, rather than limiting in any way, and the true scope of the invention is that defined in the following claims.

What is claimed is:

1. A roll lifting and transport assembly comprising:
 a. laterally spaced apart wheeled assemblies, each assembly comprising:
 b. a set of front and rear ground-supported wheels;
 c. a wheel support arm for each wheel, one of said arms of each set being formed with a journal, and the other being formed with a shaft received coaxially in said journal and mounting said arms for movement between spread loading position and a convergent, raised, transport position;
 d. lever means swingably mounted to one of said arms in alignment vertically with one of said wheels for fulcrumming engagement with the periphery of said one of said wheels to raise the arms to transport position when the lever means is swung downwardly;
 e. a demountable roll support means extending between said assemblies and supported by said arms; and
 f. releasable latch means for disengageably securing the arms in transport position.

2. The assembly of claim 1 wherein said demountable roll support means comprises an elongate member on which said roll is received in wound condition.

3. The assembly of claim 2 wherein said shaft on each assembly comprises a sleeve in which the ends of said member are rotatably received.

4. The assembly of claim 1 wherein said wheel support arms are forks, which, in loading position, are relatively spread.

5. The assembly of claim 4 wherein said latch means includes a generally vertical abutment surface on one of the journals and shafts of each of said assemblies, and a latch member supported to engage each abutment surface and prevent relative movement of said journals and shafts.

6. The assembly of claim 5 wherein said latch members are pivotally supported for vertical movement relative to said abutment surface, spring means normally biases said latch to down, abutment surface-engaging position, and actuating means associated with said lever means is connected with each of the latch members to move them to raised, released positions.

7. The assembly of claim 6 wherein said wheel forks each comprise laterally spaced legs, said lever means are mounted on pin means extending between said legs, and said latch members are independently pivoted on said pin means coaxially with said lever means; and said actuating means comprises a cord attached to said lever means and latch members.

8. The assembly of claim 4 wherein said wheel forks of each assembly each comprise differently laterally spaced legs with the legs of the fork of one of the front and rear wheels intermeshing with the legs of the other fork.

9. The assembly of claim 8 wherein the journal of each assembly comprises a sleeve spanning the wheel fork members which are least laterally spaced apart.

10. The assembly of claim 9 wherein said latch means includes an abutment stop on said journal sleeve of one of the forks, said lever means is fixed to the other wheel fork of each set, and a latch member carried by said other wheel fork is movable into and out of engagement with said stop.

11. The assembly of claim 5 in which the latch member cannot be disengaged without raising one wheel of each set off the ground by pressing the lever means into said fulcrumming engagement.

12. A method of using a roll lifting and transport assembly comprising laterally spaced apart sets of wheeled assemblies, each comprising a set of front and rear ground supported wheels, a wheel support arm for each wheel, one of said arm of each set being formed with a journal and the other being formed with a shaft received coaxially in said journal to mount said wheel support arms for movement between spread roll loading position and convergent, raised roll transport position, lever means swingably mounted to one of said arms of each set in alignment vertically with one of said wheels for fulcrumming engagement with the periphery of said one of said wheels to raise the wheel support arms to transport position when the lever means is pushed downwardly against the wheel; a demountable roll support means extending between said assemblies; and releasable latch means for disengageably securing the wheel support arms in transport position;

the steps of:
a. placing a roll in position for transport when the front and rear wheels of the assemblies are in spread relation and the journals and shafts are in lowered position,
b. pressing the levers of each assembly against said ones of said wheels as fulcrums to raise said journals and shafts of the assemblies and thereby said roll, and move said wheels to less spaced-apart transport positions;
c. raising said levers free of said ones of said wheels; and
d. exerting pressure on said levers to move said assemblies on the wheels and transport the roll.

13. The method of claim 12 wherein a leading edge of said roll is placed down, and movement of the assemblies unwinds the roll and lays it down in position.

14. The method of claim 12 wherein said wheels have pneumatic tires and pressing of said levers against the wheels depresses said tires to enlarge the fulcrum area of engagement of the levers with the tires.

15. The method of claim 12 wherein, after said roll is transported to the desired location, the levers are pressed down on said ones of said wheels once again; the latch means is then disengaged and the roll is then unloaded from the assembly.

16. The method of claim 15 wherein the levers are pressed down on said ones of said wheels sufficiently to raise said other wheels off the ground prior to disengaging said latch means.

* * * * *